US007840906B2

(12) United States Patent
Villers

(10) Patent No.: US 7,840,906 B2
(45) Date of Patent: Nov. 23, 2010

(54) UNIT AND METHOD FOR MANAGING THE DISPLAY OF A CURRENT PORTION OF A DOCUMENT ON A SCREEN

(75) Inventor: Jean-Stéphane Villers, Cergy (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 777 days.

(21) Appl. No.: 10/519,758

(22) PCT Filed: Jul. 4, 2003

(86) PCT No.: PCT/FR03/02080

§ 371 (c)(1),
(2), (4) Date: Apr. 3, 2006

(87) PCT Pub. No.: WO2004/008426

PCT Pub. Date: Jan. 22, 2004

(65) Prior Publication Data

US 2006/0230084 A1 Oct. 12, 2006
US 2008/0077637 A9 Mar. 27, 2008

(30) Foreign Application Priority Data

Jul. 8, 2002 (FR) .................................. 02 08538

(51) Int. Cl.
*G06F 3/048* (2006.01)

(52) U.S. Cl. ........................ 715/785; 715/807; 715/830

(58) Field of Classification Search ................ 715/764, 715/767, 784, 794, 797, 807, 209, 234, 273, 715/277, 760, 785, 830; 345/115
See application file for complete search history.

(56) References Cited

U.S. PATENT DOCUMENTS

| | | | | |
|---|---|---|---|---|
| 6,011,537 | A * | 1/2000 | Slotznick | 715/733 |
| 2002/0030844 | A1 * | 3/2002 | Tuli | 358/1.15 |
| 2004/0139208 | A1 * | 7/2004 | Tuli | 709/230 |

* cited by examiner

*Primary Examiner*—Ba Huynh
*Assistant Examiner*—Enrique W Iturralde
(74) *Attorney, Agent, or Firm*—Osha Liang LLP

(57) ABSTRACT

A display control unit that is used to display a current portion of a document on a screen when an interactive or scrollable page of said document requires a larger display area than that of the screen. The display control unit includes a unit which is connected to a remote server configured to deliver interactive documents including principal and secondary documents. The display control unit also includes a display unit used to control the display of a current portion of the scrollable interactive page on the screen, and a memory control unit including a priority level allocation unit configured to assign a priority level to each secondary document of the scrollable interactive page and a memory control unit used to control the storage of secondary documents with the highest priority levels in the memory.

10 Claims, 2 Drawing Sheets

```
< HTML >
< HEAD >
< TITLE >GOOD MORNING FRIENDS < / TITLE >
< / HEAD >
< BODY >
– – – –
< IMG SRC = " image 0. gif " > < BR >
– – – –
< IMG SRC = " image 1. gif " > < BR >
– – – –
< IMG SRC = " image 2. gif " > < BR >
– – – –
< B > GOOD MORNING FRIENDS < / B >
– – – –
< IMG SRC = " image 3. jpg " > < BR >
– – – –
< IMG SRC = " image N. gif " > < BR >
– – – –

< / HTML >
```

UNIT AND METHOD FOR MANAGING THE DISPLAY OF A CURRENT PORTION OF A DOCUMENT ON A SCREEN

FIELD OF THE INVENTION

The invention relates to a unit and a method for managing the display of a current portion of an incidentally interactive document on a screen, for example an HTML document.

STATE OF THE PRIOR ART

In an HTML interactive document (see the document referenced [1] at the end of the description), a set of objects mostly having a graphical representation is described. These objects may be a simple text, a simple image, a hyperlink, a pushbutton, a text entry box, etc. All these objects must be displayed in a window on the screen in the most harmonious fashion, without overlapping and while optimizing the space available. An HTML document does not prescribe the layout of the objects on the screen. This layout will be done as a function of the constraints of the display area and of certain configurable graphics characteristics or at the discretion of the display engine. The operation is called page setup. Nevertheless, general rules of layout of HTML objects must be complied with. Certain HTML elements, such as tables for example, may become unreadable if they are not presented in a form much like the original one.

An HTML document may not be displayed directly. It requires an analysis of the objects of which it is composed before it is possible to do a page setup, for example of the objects relating to one another or of nested objects. Moreover, this HTML document does not always contain sufficient data to shape the document properly, mainly when the latter contains images. The size of the images is not always known. It is necessary to load these images (request regarding a new document) so as to extract the size therefrom and to be able to continue the shaping of the document.

The HTGF ("Hyper Text Graphic Format") format corresponds to the graphical transcription of HTML documents as a function of the dimensional constraints of the display window, that is to say to the result of the page setup. This format describes mutually independent graphical objects all having an absolute positioning.

AN HTML interactive page consists of a set of files that can be interpreted by a reading program so as to produce a visual output, and possibly audio output, on a computer monitor or on a television screen. An HTML file, that can be dubbed the "main document", can contain references to external elements, such as in particular files that are visible or can be viewed on the page, which will be called "secondary documents".

In order to effect the rendition of an HTML page, these secondary documents have to be loaded, stored in memory and processed by a display engine.

The rendition of an HTML page may exceed the space available on the display screen. In this case this screen displays only a part of the HTML page and the user must scroll the display in order to see the remaining parts of the HTML page which has been stored in memory.

In the case where the HTML page contains references to secondary documents, the data loaded may require considerable memory capacity for storage, such as for example an HTML document which contains many images. The memory capacities available in a display device, for example of decoder type, may be insufficient and errors due to memory overflow may occur when rendering certain HTML pages that consume a great deal of memory. The HTML pages may then not be retrieved.

An objective of the invention is to alleviate these drawbacks by proposing a unit and a method for managing the display on a screen of a current portion of an incidentally interactive document.

DESCRIPTION OF THE INVENTION

The invention is aimed at a display management unit for displaying on a screen a current portion of a document, when a so-called scrollable interactive page of this document requires a display area of greater dimension than the dimension of said screen, said unit comprising:

- a unit for linking to a remote server, said server delivering interactive documents consisting of main documents and of secondary documents,
- a display unit for controlling the display on the screen of a current portion of said scrollable interactive page, characterized in that it comprises, furthermore, a memory and a unit for managing this memory which comprises:

- a unit for allocating priority levels so as to allocate each secondary document of the scrollable interactive page a priority level which is dependent on the positioning of each secondary document with respect to the current portion displayed on the screen,
- a memory control unit for controlling the storage in the memory of the secondary documents having the highest priority levels, possibly in cooperation with the linking unit for accessing certain of the secondary documents having the highest priority levels when the latter are not stored in the memory.

The word "server" is used here to define any type of information storage equipment.

Advantageously, the management unit of the invention furthermore comprises a format conversion unit which allows decompression of images.

Moreover, the linking unit may be linked to the remote server by a monodirectional or bidirectional link. The interactive page may be an HTML page. A keypad and/or a mouse and/or a remote control may be linked to the display unit.

The invention also relates to a method of managing display on a screen of a current portion of a document, when a so-called scrollable interactive page of this document requires a display area of greater dimension than the dimension of said screen, said method comprising:

- a step of downloading the interactive documents consisting of main documents and of secondary documents
- a step of displaying on the screen a current portion of said scrollable interactive page, characterized in that it furthermore comprises a step of selective storage in a memory of secondary documents of the scrollable interactive page which are positioned in an area neighboring the current portion displayed on the screen.

Advantageously, for each secondary document of the interactive page, a binary value is kept up to date, determining whether or not this component is stored in memory, and its download priority level.

Each secondary document of the interactive page may be allotted a priority level using a model, for example a Gaussian Model, such that the priority of a secondary document depends on its distance with respect to the central point of the new current position to be displayed: the smaller this distance, the higher the priority. The ordinate value of the curve corresponding to the projection of the point of the secondary document which is closest to the current portion displayed on the screen may thus be regarded as priority level.

The display management unit of the invention makes it possible to load elements of an interactive page selectively. The elements selected correspond to parts of the interactive page that the user displays at a given moment on the screen and the closest secondary documents within the limit of the memory capacity available.

The selective loading of these secondary documents avoids loading the content of the complete page into memory and thus significantly decreases the memory capacity requirements.

The invention is especially suited to the environment of a digital television decoder in which the available memory space remains relatively small in comparison with computers.

The invention may be used in other devices having reduced memory capacities, for example in other decoders, but also in cellular telephones, PDA ("personal digital assistant") type terminals.

DETAILED ACCOUNT OF PARTICULAR EMBODIMENTS

The invention relates to a display management unit for displaying on a screen a current portion of an interactive page, for example HTML, when this so-called scrollable interactive page requires a display area of greater dimension than the dimension of said screen.

Figures 1, 2:
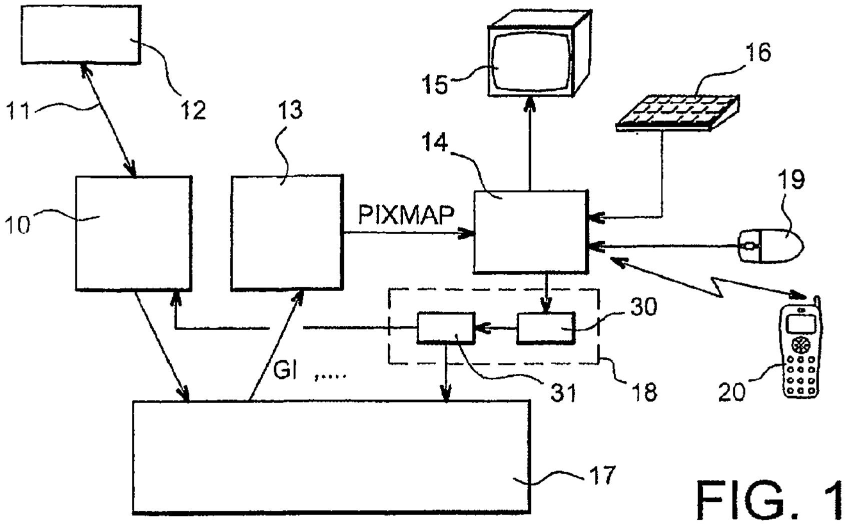
FIG. 1 illustrates the display management unit of the invention.
FIG. 2 illustrates an exemplary HTML page.

As illustrated in FIG. 1, this display management unit comprises:

- a linking unit 10 intended to receive through a monodirectional ("broadcasting", DSMCC carousel object) or bidirectional (dialogue through the HTTP protocol) link 11, data sent by a remote server 12, said server delivering interactive documents consisting of main documents and secondary documents,
- a format conversion unit 13 for converting from the GIF format, for example, to the Pixmap format, which allows image decompression,
- an allocation unit 14 for controlling the display on a screen 15 of a portion of said scrollable interactive page, which receives the scroll command, for example a page scroll-down cursor, from a keypad 16, from a mouse 19 or a remote control 20, or a directional navigation by moving focus from interactive element to interactive element (with the aid for example of a remote control).
- a memory 17 which receives information from the linking unit 10 and which dispatches data to the format conversion unit 13,
- a unit 18 for managing this memory, receiving information from the display unit 14 and dispatching information on the one hand to the memory 17 and on the other hand to the linking unit 10.

This memory management unit 18 comprises:

- a unit 30 for allocating priority levels so as to allocate each secondary document of the scrollable interactive page a priority level which is dependent on the positioning of each secondary document with respect to the current portion displayed on the screen,
- a memory control unit 31 for controlling the storage in the memory 17 of the only components having the highest priority levels, possibly in cooperation with the linking unit 10 for accessing certain of these so-called only components having the highest priority levels when the latter are not stored in the memory 17.

Exemplary HTML Page

FIG. 2 illustrates an exemplary HTML page. The latter is a string of instructions in a high-level language with which are associated secondary documents [images (GIF, JPEG, etc. formats); video (MPEG, etc. formats), sound, text, etc.].

In this example the secondary documents are as follows:

image 0.gif,
image 1. gif,
image 2. gif . . . ,
image 3. jpg,
. . .
image N. gif.

Figure 3:
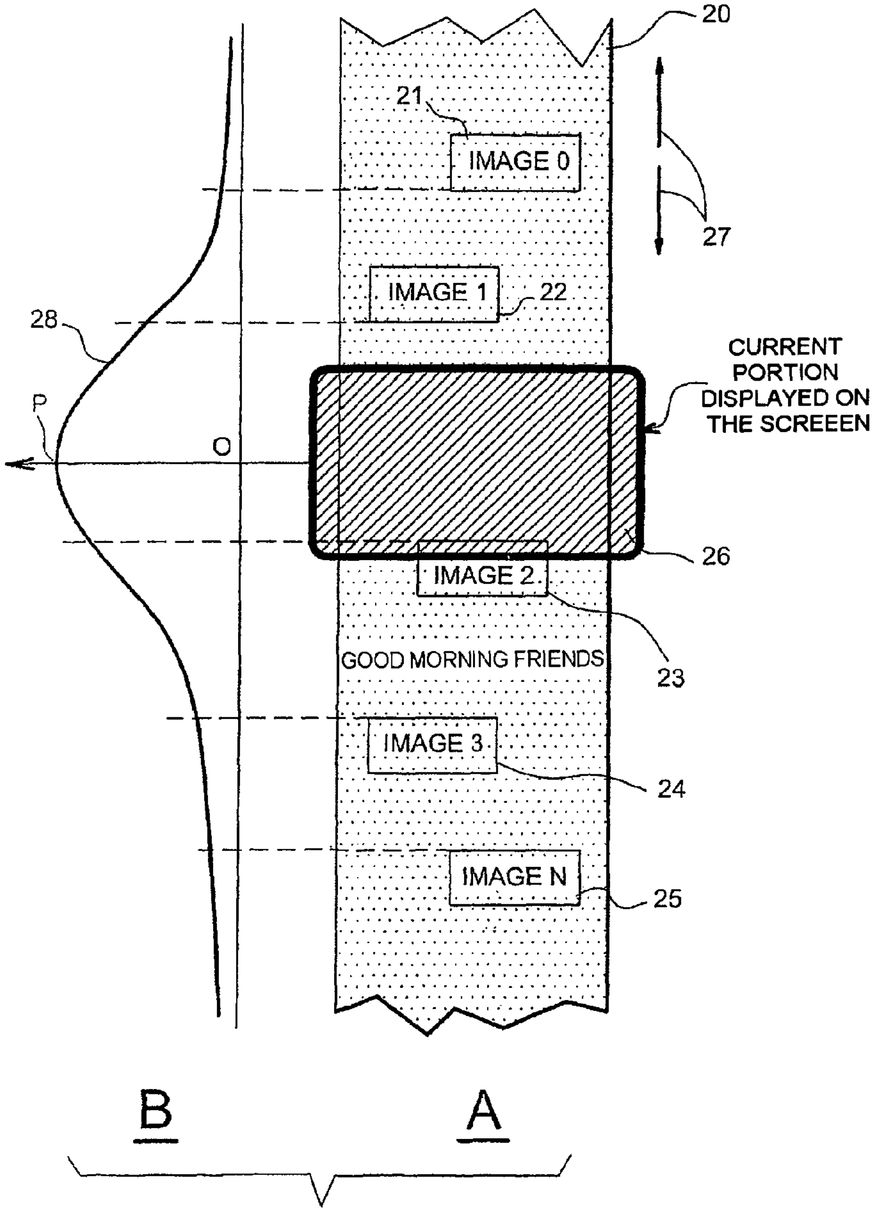
FIG. 3, part A, illustrates the HTML page of FIG. 2 interpreted by an HTML engine, and part B, associated with this part A, illustrates a model, for example Gaussian, for storing data in the memory.

As is known to the person skilled in the art such an HTML page is interpreted linearly by an engine (browser), so as to produce a page 20 of the type illustrated in part A of FIG. 3. In this page 20 are associated by inclusion secondary documents: IMAGE0, IMAGE1, IMAGE2, IMAGES3, . . . IMAGEN, marked by the small rectangles 21, 22, 23, 24 and 25.

Only a current portion of this page 20 can be displayed on a screen 26 when this page requires a display area of greater dimension than the dimension of the screen. The user can then use a keypad 16, a mouse 19 or a remote control 22 move the current portion of display of this HTML page 20.

The reference 27 illustrates the fact that this page 20 is scrollable on command by the user. As illustrated in this FIG. 3, the scroll command may be vertical, it may also be horizontal, or diagonal: it is a command for scrolling in the plane.

In the case of a decoder ("set-top-box"), for example, the total memory space reserved for the use of the engine does not make it possible to store the whole of a long HTML page. The invention therefore proposes to favor the loading and the storage in the memory of the secondary documents of the scrollable page which are positioned in a limited area around the current portion displayed on the screen. These secondary documents have, in fact, the greatest probability of being visualized on the screen upon a future movement of the current portion of visualization of the HTML page. The other secondary documents will be loaded only as a function of the quantity of free memory remaining with respect to the total memory space reserved for the use of the engine.

Part B of FIG. 3, which is associated with part A of this figure, illustrates a model, for example a Gaussian model, 28 for storing the data in the memory 17.

This model 28 makes it possible to associate a priority level with each secondary document (image, etc.) of the HTML page. It is for example possible to take into consideration the ordinate value of the curve 28 corresponding to the projection of the "point" of the secondary document which is closest to the current portion displayed on the screen.

According to the display management method of the invention, when a user asks for a change (by scrolling) of the current portion displayed on the screen, so as to display a new current portion of the HTML page a command is transmitted to the display unit 14. The unit for allocating priority level 30 updates the priority level of each secondary document using the model 28 illustrated in part B of FIG. 3 as a function of the new relative position with respect to the current portion displayed on the screen 26. The more the secondary document is positioned in proximity to the central point of the new current portion to be displayed on the screen, the higher the priority. For each secondary document of the HTML page (document 1 to document N), a binary value (1 or 0) determines whether or not this document is stored in memory. By taking account of the priority level and of the possible loading already performed of the documents, the unit for allocating priority level 30 deduces the following table therefrom:

| | priority | binary value |
|---|---|---|
| IMAGE 2 | P | 1 |
| IMAGE 1 | P-1 | 0 |
| IMAGE 3 | P-2 | 1 |
| IMAGE 0 | P-3 | 0 |
| IMAGE 4 | P-4 | 0 |

The unit for allocating priority levels 30 then instructs the memory control unit 31 to inform it of the secondary documents that can be erased from the memory 17 (potential erasure order) and of the secondary documents that must not be erased. The memory control unit 31 then authorizes the possible erasure of certain secondary documents stored in the memory, with a latching and unlatching facility, and, possibly in cooperation with the linking unit, loads into the memory 17 certain of the secondary documents that have to be loaded into the memory 17 and which are still stored on the remote server 12.

The dynamic manner of operation of said method is as follows:

1. Starting Conditions all the secondary documents with priority greater than or equal to N are loaded into memory, all the secondary documents with priority greater than or equal to N are latched in memory: they cannot be destroyed automatically, all the secondary documents with priority strictly less than N are unlatched in memory: they may be destroyed automatically, if necessary, a priority is allocated to each of the secondary documents and this priority is given to the memory manager regarding the documents already loaded so as to be used in the event of wiping on account of a lack of memory room. The documents of lowest priority will be destroyed first.

2. Loading of the Secondary Document of Priority N-1 latching in memory of all the already loaded secondary documents of priority N-1, instigation of the loading of all the still unloaded secondary documents of priority N-1, if insufficient memory, freeing of one (or of more if necessary) unlatched secondary document of lowest priority in the memory manager, if all the secondary documents of priority N-1 loaded, latching of all these secondary documents.

3. Loading of the Secondary Document of Priority N-2

The manner of operation is the same as that described in paragraph 2 above . . . .

n. Stoppage of the Loading Process

Such stoppage occurs when the memory is saturated. That is to say, all the documents of priority (N-X) could not be loaded into memory and not one more document can be destroyed.

The resumption of the loading process is effected upon a scroll command with:

calculation and allocation of new priorities, instigation of the loading process.

REFERENCES

[1] Version of the HTML standard "HTML 4.01 specification W3C recommendation 24 Dec. 1999", which may be found at the following address: http://www.w3.org/TR/1999/TEC-html401-1999 1224.

The invention claimed is:

1. A display management unit for displaying, on a screen, a current portion of a document, wherein a scrollable interactive page of the document requires a display area of greater dimension than the dimension of said screen, said unit comprising:

a unit for linking to a remote server, said server delivering interactive documents consisting of main documents and of secondary documents, a display unit for controlling the display on the screen of a current portion of said scrollable interactive page, a memory and a unit for managing the memory comprising a unit for allocating priority levels so as to allocate each secondary document of the scrollable interactive page a priority level which is dependent on the positioning of each secondary document with respect to the current portion displayed on the screen, wherein each secondary document of the interactive page is allocated a priority level using a model such that the priority of a secondary document depends on its distance with respect to the central point of a new current portion to be displayed, and a memory control unit for controlling storage of the secondary documents having the highest priority levels in the memory, in cooperation with the linking unit for accessing certain secondary documents having the highest priority levels when the secondary documents are not stored in the memory, wherein the unit for allocating priority levels is configured to, when the current portion of the scrollable interactive page is scrolled to display the new current portion, update the priorities of each of the secondary documents according to the model as a function of the relative position of each secondary document with respect to the new current portion displayed.

2. The management unit as claimed in claim 1, furthermore comprising a format conversion unit.

3. The management unit as claimed in claim 2, in which the format conversion unit allows decompression of images.

4. The management unit as claimed in claim 1, in which the linking unit is linked to the remote server by a monodirectional or bidirectional link.

5. The management unit as claimed in claim 1, in which the interactive page is an HTML page.

6. The management unit as claimed in claim 1, in which a keypad and/or a mouse and/or a remote control are linked to the display unit.

7. A method of managing display on a screen of a current portion of a document, when a scrollable interactive page of this document requires a display area of greater dimension than the dimension of said screen, said method comprising: downloading the interactive documents consisting of main documents and of secondary documents onto a device; displaying on the screen a current portion of said scrollable interactive page by selectively storing, in a memory, secondary documents of the scrollable interactive page which are positioned in an area neighboring the current portion displayed on the screen, wherein each secondary document of the interactive page is allocated a priority level using a model such that the priority of a secondary document depends on its distance with respect to the central point of a new current portion to be displayed; scrolling the current portion of the scrollable interactive page to display the new current portion; and updating the priorities of each of the secondary documents according to the model as a function of the relative position of each secondary document with respect to the new current portion displayed, after the current portion of the scrollable interactive page is scrolled.

8. The method as claimed in claim 7, in which, for each secondary document of the interactive page, a binary value 1 or 0 is kept up to date, determining whether or not this component is stored in memory, and its download priority level.

9. The method as claimed in claim 7, in which the model is a Gaussian model.

10. The method as claimed in claim 9, in which the ordinate value of the curve corresponding to the projection of the point of the secondary document which is closest to the current portion displayed on the screen is regarded as priority level.

* * * * *